(12) United States Patent
Horne et al.

(10) Patent No.: US 7,756,764 B1
(45) Date of Patent: Jul. 13, 2010

(54) CHARITABLE CONTRIBUTION SYSTEM

(75) Inventors: J. Phillip Horne, Greenville, NC (US);
James Franklin Dooley, Jr., Greenville, NC (US)

(73) Assignee: Charitable Management Systems, Inc., Greenville, NC (US)

( * ) Notice: Subject to any disclaimer, the term of this patent is extended or adjusted under 35 U.S.C. 154(b) by 1494 days.

(21) Appl. No.: 09/912,730

(22) Filed: Jul. 24, 2001

Related U.S. Application Data

(60) Provisional application No. 60/220,691, filed on Jul. 25, 2000.

(51) Int. Cl.
*G06Q 40/00* (2006.01)
(52) U.S. Cl. ............................................. 705/35; 705/39
(58) Field of Classification Search ............... 705/35–45
See application file for complete search history.

(56) References Cited

U.S. PATENT DOCUMENTS 5,283,829 A    2/1994    Anderson
5,466,919 A   11/1995   Hovakimian
5,826,241 A   10/1998   Stein et al.
5,920,847 A    7/1999    Kolling et al.
5,956,700 A    9/1999    Landry

OTHER PUBLICATIONS www.giveonline.org 1998.*
Houston Chronicle, Banks ATMs let customers give to charity. 194.*
Fidelity Charitable Gift Fund, Gift Fund Policy Guidelines: Program Circular, Dec. 2006, 28 pages, Boston, Massachusetts.

* cited by examiner

*Primary Examiner*—Richard C Weisberger
(74) *Attorney, Agent, or Firm*—MacCord Mason PLLC

(57) ABSTRACT

A method is described for transferring a tax-deductible donation from a donor's account with an asset holder to at least one qualified charitable organization for subsequent transfer to at least one charity. The donor electronically advises the asset holder of the asset to be donated and the charity that is to receive the donation. The asset holder then transfers the designated asset to at least one charitable organization. The charitable organization then transfers the asset to the identified charity, and transmitting information relating to the donation to the U.S. Internal Revenue Service, and to the donor.

10 Claims, 1 Drawing Sheet

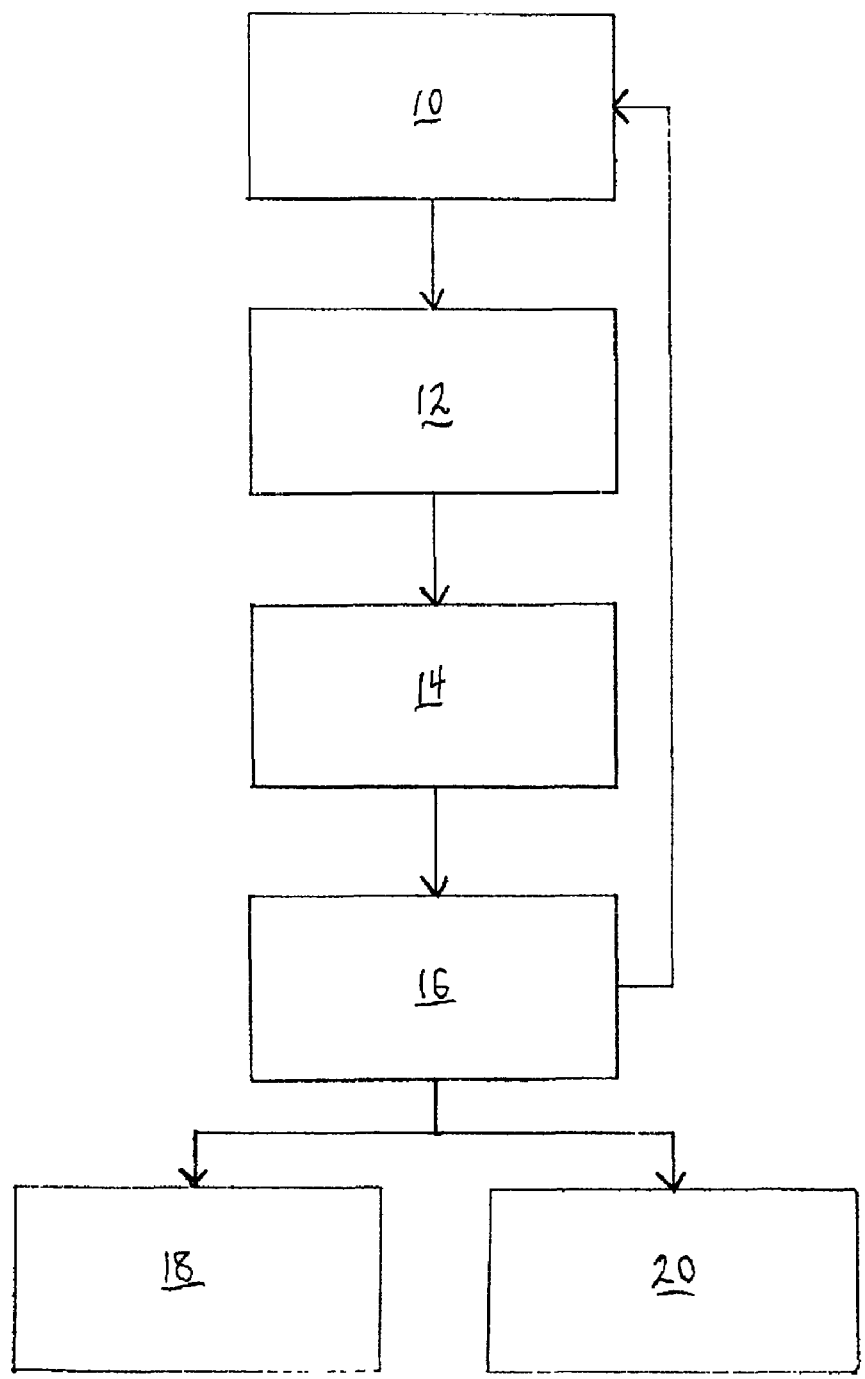

CHARITABLE CONTRIBUTION SYSTEM

This application claims the priority of provisional patent application Ser. No. 60/220,691, filed Jul. 25, 2000.

BACKGROUND OF THE INVENTION (1) Field of the Invention

The present invention relates generally to a system and method for making charitable contributions electronically through asset-holding organizations, and receiving an immediate tax deduction for such contributions.

(2) Description of the Prior Art

Contributions made to organizations meeting the requirements of §§170(b)(1)(A), 170(c), 2522, and 501(c)(3) of the Internal Revenue Code, commonly referred to as "qualified charitable organizations," are generally treated as tax-deductible to the donor. Such organizations include, but are not limited to, private foundations, community foundations, donor-advised funds, gift funds, and supporting organizations. As used herein the term Foundation, or the abbreviation Fdn, is intended to encompass all of these qualified charitable organizations.

In order to qualify as a charitable organization, a Foundation must be organized and operated exclusively for one or more of the purposes set forth in §501(c)(3) and none of the earnings of the organization may inure to any private shareholder or individual. In addition, the Foundation may not attempt to influence legislation as a substantial part of its activities, and may not participate at all in campaign activity for or against political candidates.

The exempt purposes set forth in §501(c)(3) are charitable, religious, educational, scientific, literary, testing for public safety, fostering national or international amateur sports competition, and the prevention of cruelty to children or animals. The term charitable is used in its generally accepted legal sense and includes relief of the poor, the distressed, or the underprivileged; advancement of religion; advancement of education or science; erection or maintenance of public buildings, monuments, or works; lessening the burdens of government; lessening of neighborhood tensions; elimination of prejudice and discrimination; defense of human and civil rights secured by law; and combating community deterioration and juvenile delinquency.

When a contribution is made directly to a Foundation, such as by writing a check to the Foundation, or by transferring ownership of securities or another type of asset, the donor immediately receives a receipt that is evidence of the contribution, which can be used by the donor to support a tax deduction. However, the currently available mechanisms that permit a donor to indirectly make a donation are limited to services provided by major brokers, such as the Donor Advised Fund managed by Fidelity Investments.

In these broker arrangements, the donor is given evidence of a charitable contribution at the time the donor instructs the broker to irrevocably transfer funds to the donor-advised fund. The donor can later designate charities to which the funds are to be transferred. These existing mechanisms are limited in their utility, however, and do not provide the donor with the opportunity, or motivation, to transfer assets that are held by for-profit asset holders, such as banks, or other brokers.

Thus, there is an existing need for a system and method that will enable a donor to electronically transfer assets from an asset holder to qualified charitable organizations, while receiving an immediate tax deduction. There is a further need for a system and method that will enable the donor to make charitable contributions at the time other transactions are conducted with the asset holder, thereby motivating the donor to make charitable donations.

SUMMARY OF THE INVENTION

The present invention provides a system and method for making a charitable contribution and receiving an immediate deduction by transferring an asset, e.g., money or securities, from a donor's account with an asset holder, e.g., a bank or brokerage, to a Foundation, which utilizes the asset, or proceeds therefrom, or transfers the asset or proceeds to a designated charity, as instructed by the donor, provides a receipt to the donor, and appropriately advises the Internal Revenue Service of the contribution. In some instances, the Foundation may perform both the function of a charitable organization and a charity. In those instances, a transfer within the organization from the Foundation function to the charity function should be considered to be a transfer from the Foundation to a charity as the terms are used herein.

In general, the system of the invention comprises providing an electronic information input means for use by the donor in communicating with an asset holder, providing a means for the asset holder to communicate with the designated Foundation in accordance with the donor's instructions, and providing a means for the designated Foundation to communicate with the donor, the Internal Revenue Service, and any designated charities, to provide information relevant to the contribution.

The method associated with the above system comprises transmitting information relating to a charitable contribution from the donor to an asset holder that holds the asset to be contributed, transferring the asset from the asset holder to the designated Foundation, transferring the asset, or proceeds therefrom, from the Foundation to designated charities, and transmitting information relating to the contribution from the Foundation to the donor and to the Internal Revenue Service.

The specific structure of a particular system and the steps required for the donor to input contribution information will differ depending on the need to coordinate with existing asset holder procedures, the type of asset being transferred, and the electronic device used to communicate with the asset holder. Generally, however, the same contribution information is provided by the donor.

The present system and method may be used with any asset holder with whom the donor can communicate electronically. For instance, the asset holder can be a bank, with the communication being undertaken through an automatic teller machine (ATM) or the bank's Internet website. The asset holder can also be an online securities broker with the broker's website being used as the communications tool. The donor can also access the bank or broker, or other asset holder, through various telephonic or wireless means that permit input through voice or a keypad, or through access via the Internet.

In either instance, the donor will input information components including a) User identification, b) Foundation and charity identification, c) contribution amount, and d) the source of the contribution. The asset holder will then transmit the entered information to the designated Foundation, and transfer the asset, or its monetary equivalent, less any fees.

Upon receipt of the information, the Foundation transfers the asset, or funds received from sale of the asset, to one or more designated charities in accordance with the donor's instructions, b) sends a receipt to the donor, c) periodically sends reports to charities and to donors, d) and sends required reports to Internal Revenue Service.

For instance, when the asset holder is a bank and the electronic communication means is the screen of an ATM machine, a secondary screen is provided for donor registration and input of contribution information. This secondary screen is accessed from an ATM screen, which will ask the donor if the donor wishes to make a charitable contribution.

The same basic procedure is used for online transactions through a bank or brokerage Website. The donor accesses the asset holder's website, either for the purpose of conducting other transactions with the asset holder, or specifically for the purpose of making a charitable contribution. The screen will contain a means to alert the donor to the existence and location of the charitable contribution screen.

For example, an icon may appear on the screen, either at the time the screen is opened, or at the conclusion of other transactions. Alternatively, a question may appear on the screen at the end of other transactions asking if the donor would like to make a charitable contribution. If the donor clicks on the icon, or answers the question in the affirmative, a secondary screen then appears, so that the donor can input the required information. The attached flow chart illustrates examples of secondary screens used for information input.

WAP phones, Palm-type devices, and other wireless communication devices are in the early stages of commercial use. These devices, and other communications 140 devices not yet commercialized, will also be suitable for practicing the present invention, so long as the device can be used to provide the asset holder with the information required to initiate a charitable contribution.

Upon receipt of the instructions, the bank, broker, or other asset holder, transfers the securities to the designated Foundation account, and provides a receipt and transaction record to the donor, e.g., by an email response. The Foundation confirms receipt for the donor's tax records, and maintains contributions records for individual donors. The Foundation then transfers funds to the designated charity. If the funds are in the form of securities, the Foundation holds the securities until receiving a sell instruction, and then transfers the proceeds of the securities sale to the charity. The Foundation also provides quarterly reports to charities and individuals, and provides appropriate reporting to the IRS for 990 purposes.

Thus, the present system and method enable a donor to electronically contribute to charities and receive an immediate tax deduction by providing contribution instructions to an asset holder, whether a for-profit asset holder, such as a bank or broker, or a non-profit asset holder, such as a credit union. Moreover, the system and method provide the opportunity for the donor to make such contributions at the same time that the donor is engaged in other transactions with the asset holder, thereby motivating the donor to make such contributions.

BRIEF DESCRIPTION OF THE DRAWINGS

FIG. 1 is a schematic view of the method of the present invention.

DETAILED DESCRIPTION OF THE INVENTION

As shown in FIG. 1, a donor 10 initiates a donation to a designated charity by using an electronic communication means 12, e.g., an Automatic Teller Machine, an asset holder's Internet website, a WAP phone or other electronic transmission device, to communicate with an asset holder 14, e.g., a bank or broker, that is holding assets of donor 10 of the desired contribution. Information provided by the donor can include the value of the asset to be transferred, and the identity of the charity or charities. The desired charitable organization 16 may also be designated, unless the asset holder transmits all donations through a particular charitable organization.

Upon receipt of instructions from donor 10, asset holder 14 transfers ownership of the asset to charitable organization 20. If the donor desires, an asset holder receipt can be provided by asset holder 14 to donor 10 to evidence the donor's instructions.

Charitable organization 16 receives the instructions and asset from asset holder 14. If the asset is a monetary asset, such as funds or a negotiable instrument, organization 16 transfers the asset to the designated charity or charities 18 in accordance with the donor's instructions. If the asset is a non-monetary asset, such as securities, organization 16 may convert the asset to a monetary asset before transfer to charity 18. In order to provide a tax deduction to donor 10, organization 16 also transmits information relating to the donation to the appropriate governmental tax authorities, e.g., the U.S. Internal Revenue Service. Information is also provided to donor 10 for use in filing income tax returns.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method for transferring financial securities of a donor from the donor's account with an asset holder holding said financial securities to a qualified charitable organization for subsequent transfer to at least one charity comprising:
   a) holding financial securities for said donor in said donor's account;
   b) providing an electronic communication means having a screen for use by said donor to designate the financial securities being donated and including a list of charities from which the donor can select the charity to receive the contribution;
   c) receiving instructions from said donor via said electronic communication means to transfer said financial securities to said charitable organization; and
   d) transferring said donor designated financial securities to said charitable organization.

2. The method of claim 1, wherein said list of charities can be modified by the donor.

3. The method of claim 1, wherein the electronic communication means includes a screen to enable the donor to select whether or not to receive a receipt from the asset holder.

4. The method of claim 1, wherein the electronic communication means enables the donor to request a summary of donations made by the donor during a designated time period.

5. The method of claim 1, wherein said electronic communication means is accessible by inputting a password.

6. The method of claim 1, wherein said financial securities can be allocated among multiple charities.

7. The method of claim 1, wherein said electronic communication means is a wireless electronic communication means.

8. A method for transferring financial securities of a donor from the donor's account with an asset holder holding said financial securities to a qualified charitable organization for subsequent transfer to at least one charity comprising:
   a) holding financial securities for said donor in said donor's account;
   b) providing an Automated Teller Machine having a screen for use by said donor to designate the financial securities being donated and including a list of charities from which the donor can select the charity to receive the contribution;

c) receiving instructions from said donor via said electronic communication means to transfer said financial securities to said charitable organization; and d) transferring said donor designated financial securities to said charitable organization.

9. A method for transferring financial securities of a donor from the donor's account with an asset holder holding said financial securities to a qualified charitable organization for subsequent transfer to at least one charity comprising:

a) holding financial securities for said donor in said donor's account;

b) providing an Internet website having a screen for use by said donor to designate the financial securities being donated and including a list of charities from which the donor can select the charity to receive the contribution;

c) receiving instructions from said donor via said electronic communication means to transfer said financial securities to said charitable organization; and d) transferring said donor designated financial securities to said charitable organization.

10. The method of claim 1, further including the step of providing the donor with a receipt evidencing transfer of the financial securities and the date of the transfer.

* * * * *